US009014357B2

(12) United States Patent
Bychkov et al.

(10) Patent No.: US 9,014,357 B2
(45) Date of Patent: *Apr. 21, 2015

(54) CONTENT DELIVERY DURING CALL IDLE TIME

(71) Applicant: Google Inc., Mountain View, CA (US)

(72) Inventors: Eyal Bychkov, Hod Hasharon (IL); Uri Ron, Kfar Saba (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,208

(22) Filed: Jan. 26, 2014

(65) Prior Publication Data

US 2014/0179299 A1    Jun. 26, 2014

Related U.S. Application Data

(62) Division of application No. 12/009,228, filed on Jan. 17, 2008, now Pat. No. 8,675,850.

(51) Int. Cl.
| | |
|---|---|
| *H04M 15/00* | (2006.01) |
| *H04L 29/06* | (2006.01) |
| *H04W 4/18* | (2009.01) |
| *H04M 3/44* | (2006.01) |
| *H04M 1/725* | (2006.01) |
| *H04M 3/487* | (2006.01) |

(52) U.S. Cl.
CPC ...... *H04W 4/18* (2013.01); *H04M 3/44* (2013.01); *H04M 3/4878* (2013.01); *H04M 1/72522* (2013.01); *H04M 1/72544* (2013.01); *H04M 1/72558* (2013.01)

(58) Field of Classification Search
CPC ............... H04M 1/72522; H04M 1/72544; H04M 1/72558; H04M 3/42; H04M 3/42017; H04M 3/4285; H04M 3/4878; H04W 4/18
USPC .............. 379/67.1, 82, 93.01, 93.35, 101.01, 379/114.13; 455/414.1, 414.3
See application file for complete search history.

(56) References Cited

U.S. PATENT DOCUMENTS

| | | | |
|---|---|---|---|
| 6,201,855 B1 | 3/2001 | Kennedy | |
| 7,082,193 B2 | 7/2006 | Barclay et al. | |
| 7,266,591 B1 | 9/2007 | Johnston | |
| 2004/0038708 A1* | 2/2004 | Tsai et al. ...................... | 455/557 |

(Continued)

OTHER PUBLICATIONS

Jajah:IncallAdvertising: The Voice 2.0 Advertising Network, 2007. http://www.jajah.com/downloads/campaign/audio/Jajah_Incal-lAdvertising.pdf.

(Continued)

*Primary Examiner* — Khai N Nguyen
(74) *Attorney, Agent, or Firm* — Soquel Group LLC

(57) ABSTRACT

A method for effective utilization of call idle time, including detecting by the processor of a phone, that a first person using the phone has initiated a phone call to a second person, and that the second person has not yet answered the call, wherein the phone is operative in an idle mode to present content pre-designated by the first person, and is operative in a normal mode to send and receive voice communications to and from the second person and to not present the pre-designated content, activating the idle mode of the phone in response to the detecting, subsequently detecting, by the processor of the phone, that the second person has answered the call, and subsequently activating the normal mode of the phone in response to the subsequently detecting.

13 Claims, 5 Drawing Sheets

(56) References Cited

U.S. PATENT DOCUMENTS

| | | |
|---|---|---|
| 2005/0286691 A1* | 12/2005 | Taylor et al. ............. 379/114.03 |
| 2006/0285675 A1* | 12/2006 | Radziewicz et al. ..... 379/215.01 |
| 2007/0004384 A1 | 1/2007 | Anupam |
| 2007/0121821 A1* | 5/2007 | Su ............................... 379/88.13 |
| 2007/0178889 A1* | 8/2007 | Cortegiano et al. ......... 455/414.3 |
| 2007/0189474 A1* | 8/2007 | Cai .......................... 379/142.01 |
| 2007/0226061 A1* | 9/2007 | Chen et al. ...................... 705/14 |
| 2007/0299939 A1 | 12/2007 | Johnston |
| 2008/0025478 A1* | 1/2008 | Taylor et al. .................... 379/70 |
| 2008/0037529 A1* | 2/2008 | Bangalore et al. ............ 370/354 |
| 2008/0147493 A1* | 6/2008 | Aarnio et al. ................... 705/14 |
| 2009/0016323 A1 | 1/2009 | Ethier et al. |
| 2009/0046838 A1 | 2/2009 | Andreasson |

OTHER PUBLICATIONS

Call-Hold Marketing!, 2003. http://www.call-hold.com/intro.htm.

* cited by examiner

CONTENT DELIVERY DURING CALL IDLE TIME

CROSS REFERENCES TO RELATED APPLICATIONS

This application is a divisional of U.S. patent application Ser. No. 12/009,228, now U.S. Pat. No. 8,675,850, entitled CONTENT DELIVERY DURING CALL IDLE TIME, and filed on Jan. 17, 2008 by inventors Eyal Bychkov and Uri Ron.

FIELD OF THE INVENTION

The field of the present invention is cell phone functionality.

BACKGROUND OF THE INVENTION

When people use their cell phones for making calls, there is inherently a significant amount of idle time during the calls that is wasted and nevertheless incurs expense or uses up a subscriber's free minutes. Idle time occurs while a caller is waiting for a person to answer, or while a caller is put on hold or on call waiting.

Specifically, after the caller has placed a call to a person, referred to herein as a "callee", idle time occurs while the caller is waiting for the callee or the callee's answering machine to answer. During such time the caller typically listens to ringing tones. In some instances the callee may, for a fee, engage a system that plays to the caller a soundtrack pre-designated by the callee, instead of ringing tones, while the caller is waiting for the callee or the callee's answering machine to answer. Such systems are referred to as "ringback tones" systems. A new company, Jajah Inc. of Mountain View, Calif., offers a service whereby ringing tones are replaced by recorded advertisements.

After a call is in progress, idle time occurs when the caller is put on hold. For example, the caller may be transferred to another person. Such call holding is typical when a caller calls a customer service representative and an automatic answering service transfers the call.

Idle time also occurs when a second caller calls the callee, and the callee puts the first caller on call waiting while the callee speaks with the second caller.

During such call waiting/call hold idle time, the caller is required to stay tuned to the call, in order to be available for the conversation when it resumes. In some instances the caller listens to ring tones, background sounds, background music, or background radio, initiated by the callee's calling system during call waiting/call hold.

Idle time also occurs during passive silent moments, when the callee leaves the call and has the caller wait for the callee, without putting the caller on hold.

In all of these circumstances the caller's time is wasted. The caller either waits idly for the callee, or receives content of little or no use to him.

It would thus be desirable to be able to leverage caller idle time to the caller's benefit.

SUMMARY OF THE DESCRIPTION

Aspects of the present invention relate to a technology for utilizing caller idle time to the caller's advantage, as pre-designated by the caller. An enhanced cell phone, in accordance with an embodiment of the present invention, includes a media player and a controller that operates the phone in two modes; namely, a normal mode and an idle mode. In normal mode, the cell phone is operative to send and receive voice communications using a baseband modem, for conversation between a first party and a second party. In idle mode, the cell phone is operative to play content that was pre-designated by the owner of the cell phone, such as pre-designated music, movies, video clips, digital publications and advertising. Alternatively, the cell phone is operative in idle mode to play games, including single player games, and multi-player games with other cell phone users.

The controller is programmed to switch a first party's cell phone to normal mode and to idle mode when certain events are detected. Events triggering idle mode include inter alia (i-a) the first party waiting for the second party, or the second party's answering machine, to answer the call, (ii-a) the first party being placed on call waiting, (iii-a) the first party being put on hold, (iv-a) a conversation between the first party and the second party being silenced for a relatively long period of time, and (v-a) the first party manually switching his cell phone to idle mode by pressing a specified button or combination of buttons. Correspondingly, events triggering switch-back to normal mode include (i-b) the second party, or the second party's answering machine, answering the call, (ii-b) the call waiting being ended, (iii-b) the call hold being ended, (iv-b) the silent period being ended, and (v-b) the first party manually switching his cell phone to normal mode by pressing a specified button or combination of buttons.

Further aspects of the present invention enable the first party's cell phone, when switched to idle mode, to transmit a pre-recorded message to the second party's cell phone, instructing the second party to press a specified button in order to resume the call. E.g., "Please press * to resume conversation." Then, when the second party presses the star key and the first party's cell phone receives the corresponding DTMF signal, the first party's cell phone switches back to normal mode.

Yet further aspects of the present invention enable the cell phone controller to record a position of the pre-designated content, where the content stopped being played at the end of an idle mode. During a subsequent idle mode, the pre-designated content resumes play at the recorded stop position.

Additional aspects of the present invention enable the cell phone owner, when his cell phone is playing advertising content in idle mode, to skip over ads that he does not wish to play. The cell phone reports information about ads that were skipped to advertising companies, thereby assisting the companies in better profiling and segmenting the owner.

There is thus provided in accordance with an embodiment of the present invention a method for effective utilization of call idle time, including automatically detecting that a first person using a phone has initiated a phone call to a second person, and that the second person has not yet answered the call, wherein the phone is operative in an idle mode to present content pre-designated by the first person, and is operative in a normal mode to send and receive voice communications to and from the second person and to not present the pre-designated content, activating the idle mode of the phone in response to the automatically detecting, further automatically detecting that the second person has answered the call, and automatically activating the normal mode of the phone in response to the further automatically detecting.

There is further provided in accordance with an embodiment of the present invention a method for effective utilization of call idle time, including detecting that a first person using a phone, during a phone conversation with a second person, has been placed on call waiting by the second person, wherein the phone is operative in an idle mode to present content pre-designated by the first person, and is operative in a normal mode to send and receive voice communications to and from the second person and to not present the pre-designated content, activating the idle mode of the phone in response to the detecting, further detecting that the second person has resumed the call, and activating the normal mode of the phone in response to the further detecting.

There is yet further provided in accordance with an embodiment of the present invention a method for effective utilization of caller idle time, including in response to a first person being placed on call hold or on call waiting by a second person during a phone conversation between the first person and the second person, transmitting a pre-recorded message from the first person's phone to the second person's phone instructing the second person to push a specified button or combination of buttons to resume the conversation, receiving, by the first person's phone, a DTMF signal from the second person's phone corresponding to the specified button or combination of buttons, and in response to the receiving, notifying the first person that the conversation has resumed.

There is moreover provided in accordance with an embodiment of the present invention a cell phone with effective utilization of call idle time, including an antenna, a baseband modem connected to the antenna, including a radio frequency interface, a power subsystem, an audio/video/text player, and a controller connected to the baseband modem, to the power subsystem and to the audio/video/text player for programmatically operating the cell phone in an idle mode and in a normal mode, whereby in normal mode the cell phone sends and receives voice communications via the baseband modem, and in idle mode the cell phone presents pre-designated content via the audio/video/text player.

There is additionally provided in accordance with an embodiment of the present invention a cell phone that also functions as a media player, including an antenna, a baseband modem connected to the antenna, including a radio frequency interface, a power subsystem, an audio/video/text player, a controller connected to the baseband modem, to the power subsystem and to the audio/video/text player for programmatically operating the cell phone in an player mode and in a phone mode, whereby in phone mode the cell phone sends and receives voice communications via the baseband modem, and in player mode the cell phone presents content via the audio/video/text player, wherein the controller switches the cell phone from phone mode to player mode during silent portions of a phone conversation, and switches the cell phone from player mode to phone mode during non-silent portions of a phone conversion.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to enhanced cell phone functionality. The enhanced functionality enables cell phones to operate in both a normal mode and an idle mode, and to switch between modes when appropriate events are detected.

Figure 1:
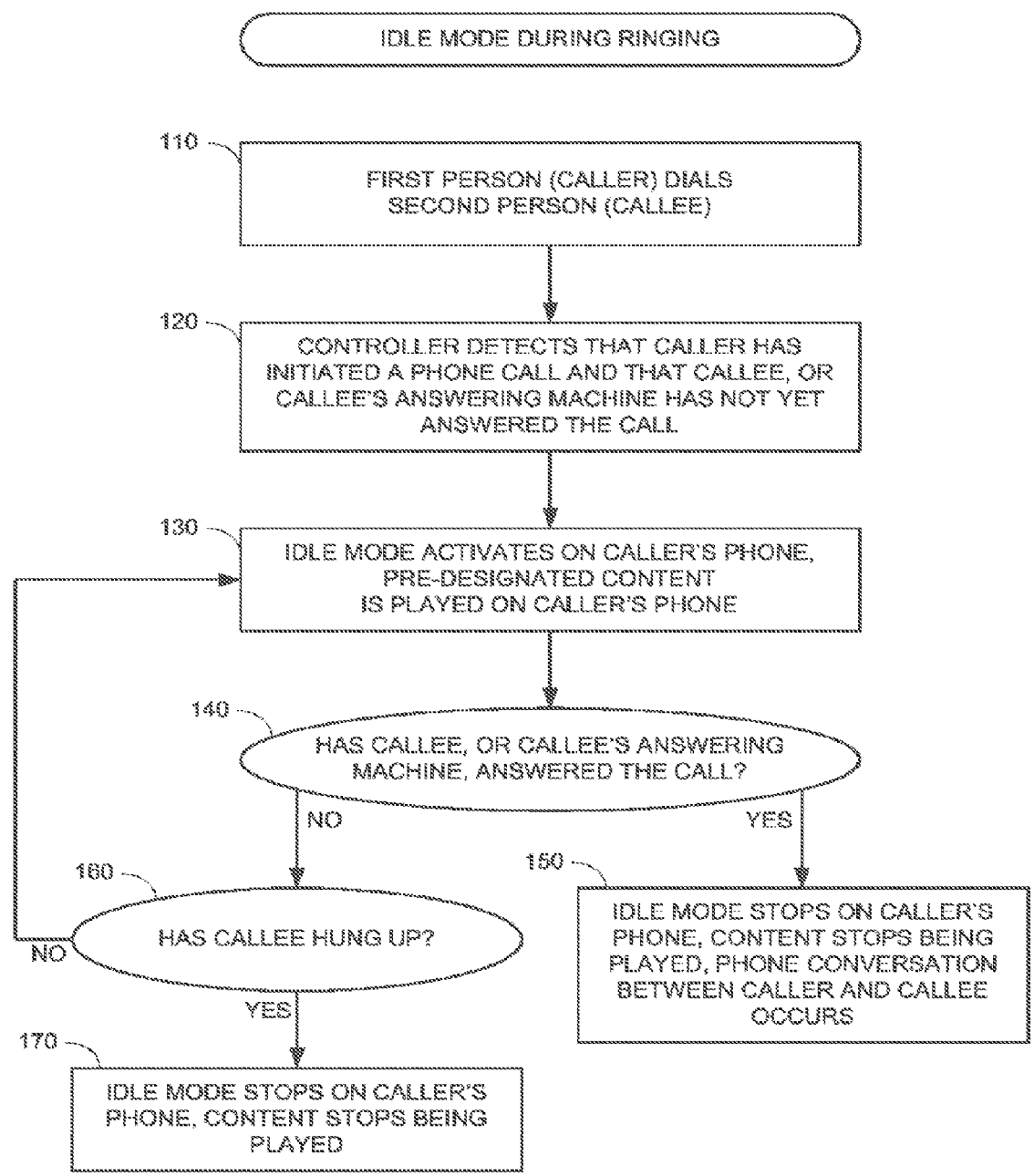
FIG. 1 is a simplified flowchart of a method for utilizing caller idle time during call ringing to play media content, in accordance with an embodiment of the present invention.

Reference is now made to FIG. 1, which is a simplified flowchart of a method for utilizing caller idle time during call ringing to play media content, in accordance with an embodiment of the present invention. At step 110 a caller dials a callee, using the caller's cell phone, to make a phone call. The caller's cell phone operates in two modes; namely, a normal mode and an idle mode. In normal mode, the caller's cell phone is operative to send and receive voice communications between the caller and the callee. In idle mode, the caller's cell phone is operative to play content that was pre-designated by the caller. The pre-designated content is not played when the caller's cell phone is in normal mode.

The pre-designated content may be audio and video content; i.e., the caller can, for example, listen to music and watch movies and video clips on his cell phone. The pre-designated content may be stored locally in the caller's cell phone. Alternatively, the pre-designated content may be streamed over the air from a content server to the phone, or downloaded by the phone from the content server. The content server may be operated by a wireless communication operator, or by an external service provider.

The pre-designated content may be text content, such as a book; i.e., the caller can, for example, read a digital publication on his cell phone, such as a digital book, a digital newspaper, a digital periodical, or a digital patent. The text content is presented in a display format suitable for reading. Examples of mobile device text readers are Microsoft Reader, manufactured and distributed by Microsoft Corporation of Redmond, Wash.; Mobipocket™ Ebook Reader, manufactured and distributed by Mobipocket.com of Paris, France; and BookReader, manufactured and distributed by Rudenko Software.

The pre-designated content may also be advertising presented by an ad server; i.e., the caller can, for example, listen to and view ads. The ads may be streamed over the air from the ad server to the phone, or downloaded by the phone from the ad server. The ad server may be operated by a wireless communication operator, or by an external Internet advertising service.

In this regard it is noted that a drawback with prior art advertisement delivery to callers is that a caller may not be interested in the ads delivered to him, even with targeted ads. A new company, Pudding Media, Inc. of San Jose, Calif. uses voice recognition to monitor a phone conversation, and pushes targeted ads to the caller based on context of the conversation, as well as caller demographics. Pudding Media, as well as other companies, offer subsidized rates for users who listen to their advertisements. Thus the caller may specifically pre-designate such advertising as the content to be played during idle time, in order to benefit from the accompanying subsidies.

In accordance with an embodiment of the present invention, when ads are played to the caller during idle time, the caller is able to skip ads by pressing a designated button on the keypad. Upon pressing the designated button, the content advances to the next ad. Moreover, information as to which ads are skipped by the caller is provided to advertising services to improve their profiling and segmenting of the caller.

Content pre-designated by the caller may be callee-specific; i.e., the content to be played during idle mode may be designated as dependent upon whom the callee is. Thus, when the callee is callee #1, the caller's phone plays pre-designated content C1, and when the callee is callee #2, the caller's phone plays pre-designated content C2.

In an alternative embodiment of the present invention, the caller's cell phone is operative in idle mode to play games, including single player games, and multi-player games with other cell phone users.

At step 120 a controller in the caller's cell phone (element 510 of FIG. 5) detects that the caller has initiated a phone call, and that the callee, or the callee's answering machine, has not yet answered the call. At step 130 the idle mode is activated on the caller's cell phone, and the pre-designated content is played on the caller's cell phone. In an embodiment of the present invention, step 130 is performed automatically by the controller. Step 130 may also include prompting the caller to confirm whether or not he wishes to switch his cell phone to idle mode, and only switching to idle mode if so prompted by the caller.

In another embodiment of the present invention, step 130 is performed by the caller, who manually switches his cell phone to idle mode. The caller can push a special key or combination of keys to switch his cell phone to idle mode. Similarly, the caller can push a special key or combination of keys to switch his cell phone to normal mode.

At step 140 a determination is made whether or not the callee, or the callee's answering machine, has answered the call. If so, then at step 150 the normal mode of the caller's cell phone is activated, the caller's cell phone stops playing the pre-designated content, and a phone conversation transpires between the caller and the callee. If the callee has not answered the call, then at step 160 a further determination is made whether or not the caller has hung up. If not, then processing returns to step 130 and the caller's cell phone remains in idle mode, and the pre-designated content continues being played. If the caller has hung up, then at step 170 the idle mode stops.

In an alternative embodiment of the present invention, steps 120 and 140 of FIG. 1 may be performed at a cellular gateway, instead of at the caller's cell phone. Specifically, the gateway detects that the callee has not answered his phone at step 120, or has answered his phone at step 140; and the gateway triggers the activation of idle mode at step 130, and the activation of normal mode at step 150. Alternatively, steps 120 and 140 may be performed by both the caller's cell phone and the gateway in combination.

Figure 2:
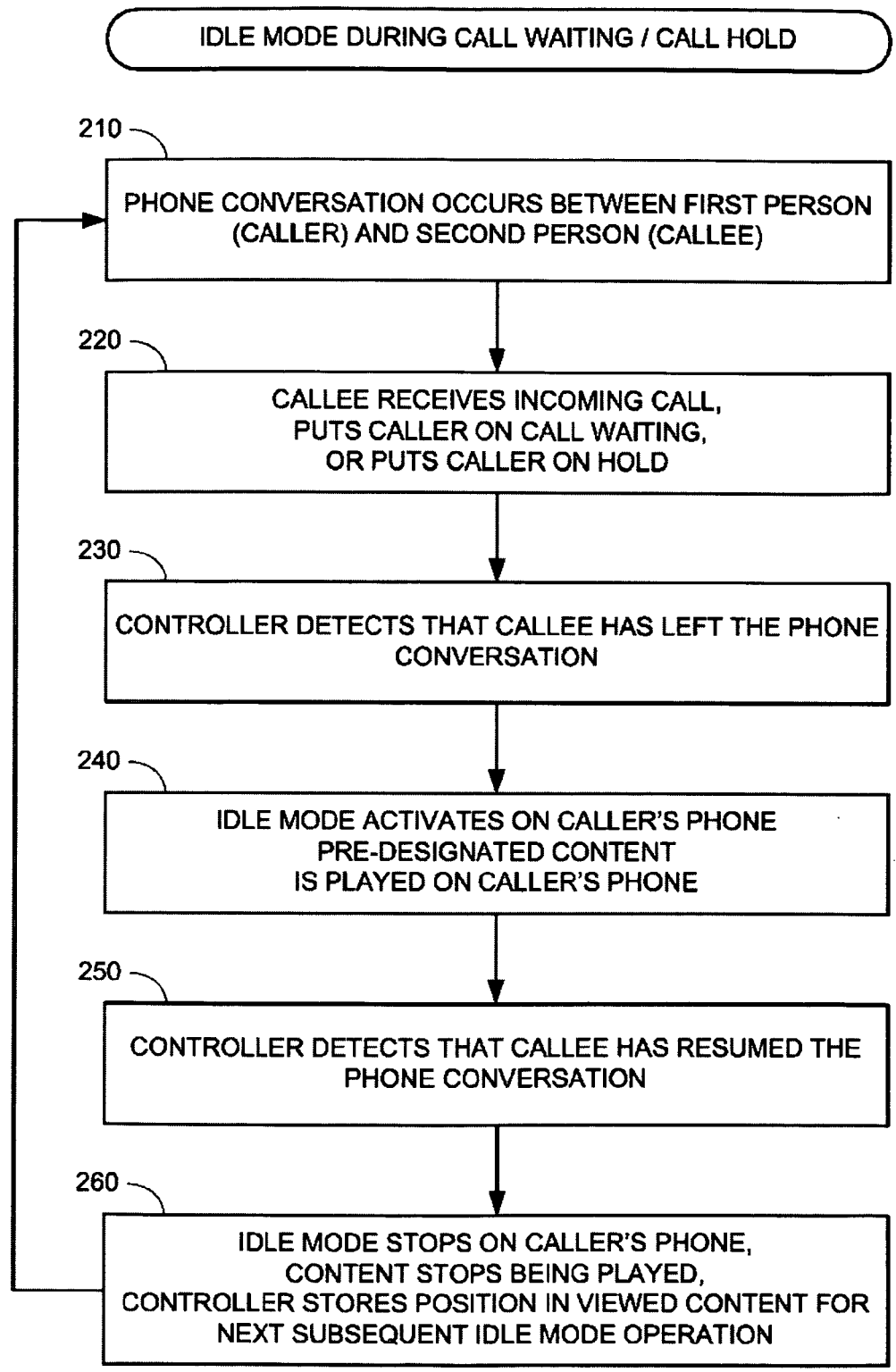
FIG. 2 is a simplified flowchart of a method for utilizing caller idle time during call waiting or call holding to play media content, in accordance with an embodiment of the present invention.

Reference is now made to FIG. 2, which is a simplified flowchart of a method for utilizing caller idle time during call waiting or call holding to play media content, in accordance with an embodiment of the present invention. At step 210 a conversation is underway between a caller and a callee. At step 220 the callee places the caller on call waiting or on call hold. Call waiting is generally used by the callee when he receives a call from a second caller during his conversation with the first caller, and the callee wishes to answer the second caller's call without losing the first caller on the line. Call holding is generally used by the callee when he transfers the caller to another person, or when he wishes to engage in a muted discussion, without the caller being able to listen, and without losing the caller on the line. In either case, the caller experiences idle time.

The caller also experiences idle time during silenced parts of a conversation; namely, when the callee has left the conversation without necessarily putting the caller on hold.

At step 230 a controller in the caller's cell phone (element 510 of FIG. 5) detects that the callee has left the conversation by putting the caller on call waiting, on call hold, or by a silence. In accordance with an embodiment of the present invention, the controller automatically detects call waiting and call hold. In accordance with another embodiment of the present invention, the controller automatically detects relatively long periods of silence.

At step 240 the idle mode of the caller's cell phone is activated, and the caller's cell phone plays the caller's pre-designated content. Step 240 may be performed automatically by the controller, or manually by the caller. Step 240 may also include prompting the caller to confirm whether or not he wishes to switch his cell phone to idle mode, and only switching to idle mode if so prompted by the caller.

At step 250 the controller detects that the callee has resumed the phone conversation. In this regard, it is noted that one of the challenges in implementing idle mode is detecting when the callee has resumed the conversation and when to switch the caller's phone from idle mode to normal mode. In accordance with an embodiment of the present invention, when the caller's cell phone is in idle mode, it switches back to normal mode upon receipt of a dual tone multi-frequency (DTMF) telephone signal, such as a specific button press, from the callee's phone. Further in accordance with this embodiment, when the caller's cell phone is switched to idle mode, it sends a pre-recorded message to the callee instructing the callee to press the specific button upon his returning to the call. E.g., "Please press * to resume conversation." Then, when the callee presses the star key and the caller's cell phone receives the corresponding DTMF signal, the caller's cell phone switches back to normal mode.

The present invention is particularly advantageous for callers who call service providers or customer representatives. Using prior art technology, the caller is typically placed on hold while listening to waiting music or advertisements, and is required to stay tuned to the call in order to be available when the service provider or customer representative is ready. Using the present invention, the caller shifts the responsibility of resuming the call to the callee; namely, the party that put the caller on hold to begin with.

Finally, at step 260 the normal mode of the caller's phone is activated. The idle mode stops and the caller's phone stops playing the pre-designated content. Processing then returns to step 210.

Another one of the challenges in implementing idle mode is the lack of a known time period for how long the idle mode will remain activated. Call waiting, for example, can be brief, on the order of a few seconds, or long, on the order of several minutes. Pre-designated content being played on the caller's phone during idle mode may be stopped prior to completion, when the caller's phone is switched back to normal mode.

In accordance with an embodiment of the present invention, when the idle mode is stopped at step 260, the controller records the current stop position of the pre-designated content. When the idle mode is activated at step 240, the caller's cell phone begins playing the pre-designated content from the recorded stop position. As such, the pre-designated content played to the user during idle mode is resumed during a subsequent idle mode. For pre-designated content that is callee-specific, as described hereinabove, content play is resumed during a subsequent idle mode with the same callee.

Similarly, if the caller's phone is operative to play a game during idle mode, then the controller records the current state of the game when the idle mode is stopped at step 260. When the idle mode is activated at step 240, the caller's phone resumes the game from the recorded state at which the game previously stopped.

As described hereinabove with reference to FIG. 1, in an alternative embodiment of the present invention steps 230 and 250 of FIG. 2 may be formed at a cellular gateway instead of at the caller's cell phone. Specifically, the gateway detects that the callee has left the conversation at step 230, and has resumed the conversation at step 250; and the gateway triggers the activation of idle mode at step 240, and the activation of normal mode at step 260. Alternatively, steps 230 and 250 may be performed by both the caller's cell phone and the gateway in combination.

It will be appreciated by those skilled in the art that if the callee's cell phone also implements idle mode, step 230 is triggered on the callee's cell phone when the caller has left the conversation, such as by putting the callee on call waiting or call hold; and step 250 is triggered on the callee's cell phone when the caller resumes the conversation.

In general, both the caller and the callee can activate and de-activate idle mode of their respective cell phones. Moreover, in accordance with an embodiment of the present invention, each cell phone may be configured to have a maximum time limit for remaining in idle mode. Thus, in a state where both the caller's and the callee's cell phones are in idle mode, the maximum time limit ensures that idle mode times out and such state does not continue indefinitely.

Figure 3:
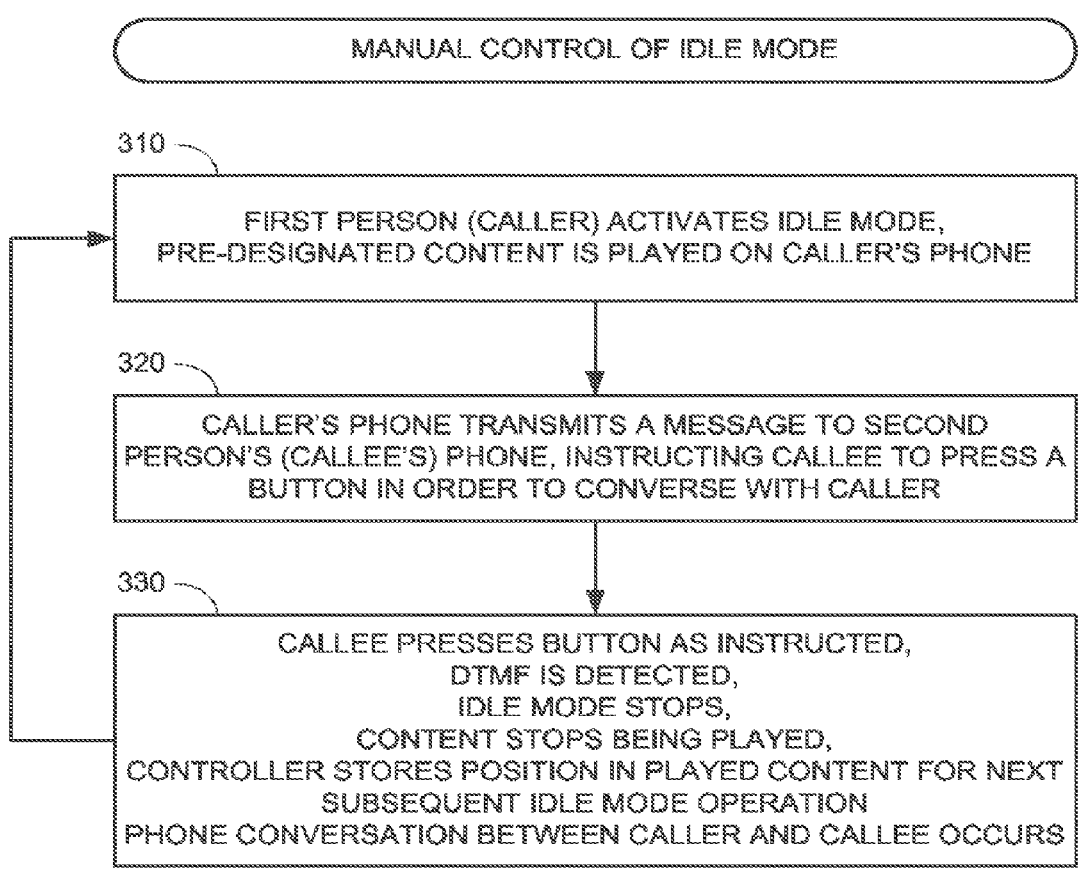
FIG. 3 is a simplified flowchart of a manually controlled idle mode, in accordance with an embodiment of the present invention.

Reference is now made to FIG. 3, which is a simplified flowchart of a manually controlled idle mode, in accordance with an embodiment of the present invention. At step 310 the caller manually activates the idle mode of his cell phone. Step 310 may be performed while the callee's phone is ringing, prior to initiation of a conversation, or during the conversation when the caller is placed on call waiting or call hold, or when the conversation is silenced. During idle mode, the caller's cell phone plays the caller's pre-designated content.

At step 320 the caller's cell phone sends a message to the callee, instructing the callee to press a specified button in order to resume the conversation with the caller. At step 330, the callee presses the button as instructed, and a corresponding DTMF signal is sent to the caller's phone. Upon receipt of the DTMF signal, a controller of the caller's cell phone (element 510 of FIG. 5) automatically switches the caller's cell phone back to normal mode. The idle mode stops, and the caller's cell phone stops playing the pre-designated content. The controller stores the play position of the pre-designated content where it was stopped, for the caller's cell phone to begin playing the content therefrom during a subsequent idle mode. Processing then returns to step 310.

It will be appreciated by those skilled in the art that the caller may manually switch his phone from idle mode to normal mode at step 330, instead of the controller doing so automatically.

It will further be appreciated by those skilled in the art that if the callee's cell phone also implements idle mode, then the callee may manually activate idle mode or normal mode, similar to the caller. As such, a state may occur where both the caller's and the callee's cell phones are in idle mode. To break out of such a state, the caller and the callee may manually switch their cell phones to normal mode. Alternatively, the caller and the caller may configure maximum time out periods for idle mode, as described hereinabove with reference to FIG. 2.

The use cases described hereinabove with reference to FIGS. 1-3 relate to a cell phone operating in idle mode during idle call time, including call ringing, call waiting, call holding, and call silence. In a different use case, a user's phone dual functions as a cell phone and as a content player; i.e., the phone supports a phone mode and a player mode. The user can listen to content on his cell phone in player mode, prior to making a phone call, and interrupt his listening to make an outgoing phone call or to answer an incoming phone call. The phone operates in phone mode and suspends playing the content during the phone conversation, and operates in player mode and continues playing the content during idle call time, and after the call is finished.

Figure 4:
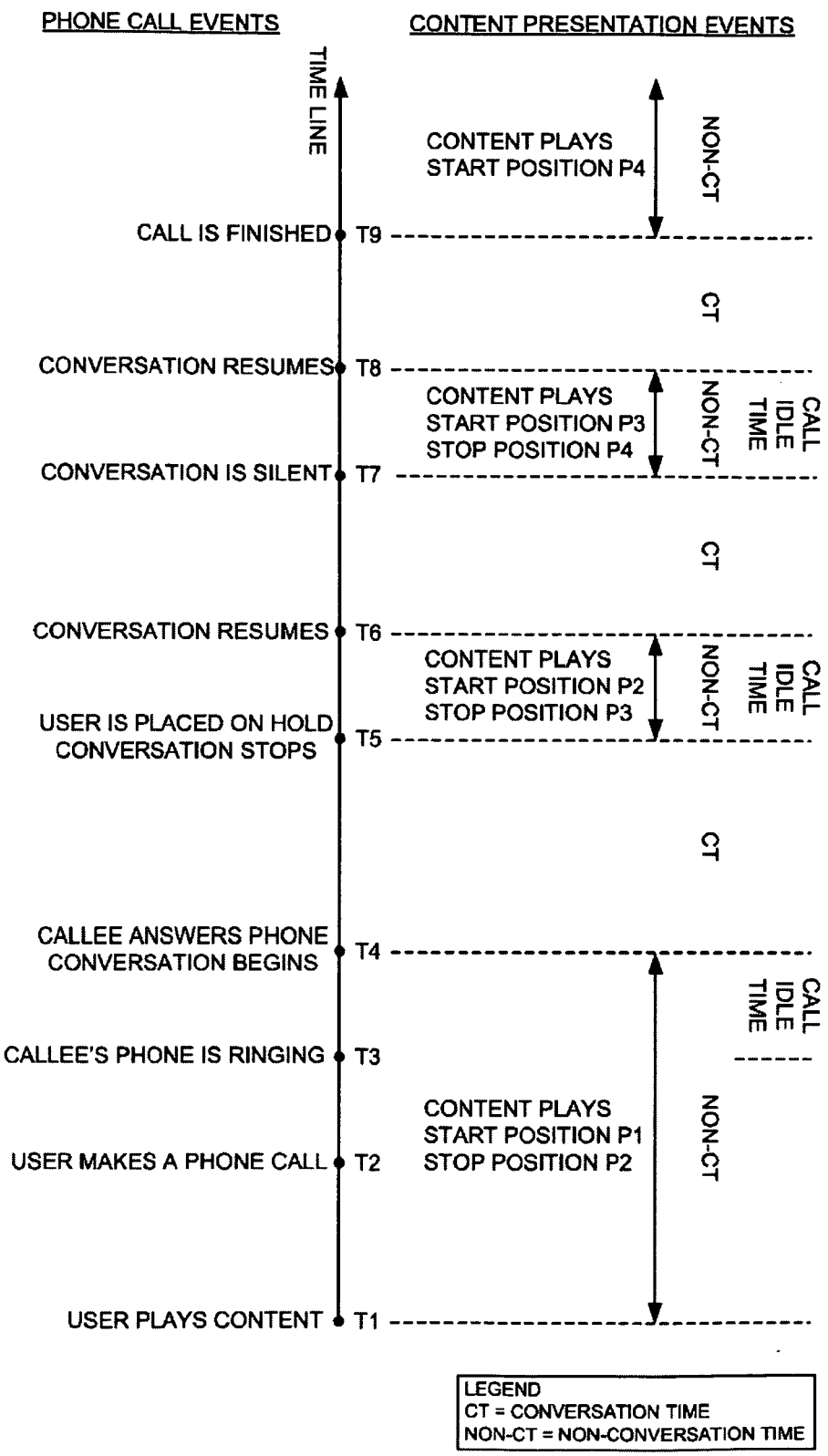
FIG. 4 is a simplified exemplary time line of phone call events and corresponding content presentation events, in accordance with an embodiment of the present invention.

In this regarding, reference is now made to FIG. 4, which is a simplified exemplary time line of phone call events and corresponding content presentation events, in accordance with an embodiment of the present invention. It will be appreciated by those skilled in the art that the sequence of phone call events shown in FIG. 4 is but one example for a variety of possible event sequences.

At time T1, a user begins playing content on his cell phone. The content is played from a starting position, P1. At this stage, the user's cell phone operates in player mode as a content player. The user continues listening to his content until time T2, at which time the user makes an outgoing phone call to a callee. At time T3 the callee's phone rings, and at time T4 the callee answers his phone and a conversation between the user and the callee begins. During the time interval between times T1 and T4, the user's cell phone continues to play content. At time T4, when the callee answers his phone, the user's cell phone suspends playing the content at a stop position, P2, which is stored in the user's cell phone for future reference. The user's cell phone then switches to phone mode.

The conversation between the user and the callee continues until time T5, when the callee places the user on hold. At this stage the user's cell phone switches from phone mode back to player mode and resumes playing the content from position P2. At time T6 the callee cancels the call holding and resumes the conversation. In turn, the user's cell phone suspends playing the content at a stop position, P3, which is stored in the user's cell phone, and the user's cell phone switches from player mode back to phone mode.

At time T7 the conversation is silent, which triggers the user's cell phone to switch from phone mode back to player mode, and resume playing the user's content from position P3. At time T8 the conversation resumes, which triggers the user's phone to suspend playing the content at a stop position, P4, which is stored in the user's cell phone, and to switch back to phone mode. Finally, at time T9 the phone call ends, the user's cell phone switches back to player mode and resumes playing the user's content from position P4.

It is noted in FIG. 4 that call idle time has been effectively utilized to play the user's content. This is in contrast with prior art technology, where the user must wait idly, or must listen to content chosen by the callee or by a wireless communication operator, during call idle time.

It will be appreciated by those skilled in the art that if instead of making an outgoing phone call to a callee at time T2, the user receives an incoming phone call from a caller, the user's cell phone switches from player mode to phone made when the user answers the call, and a sequence of phone events and corresponding player events similar to the sequence illustrated in FIG. 4 can transpire.

Figure 5:
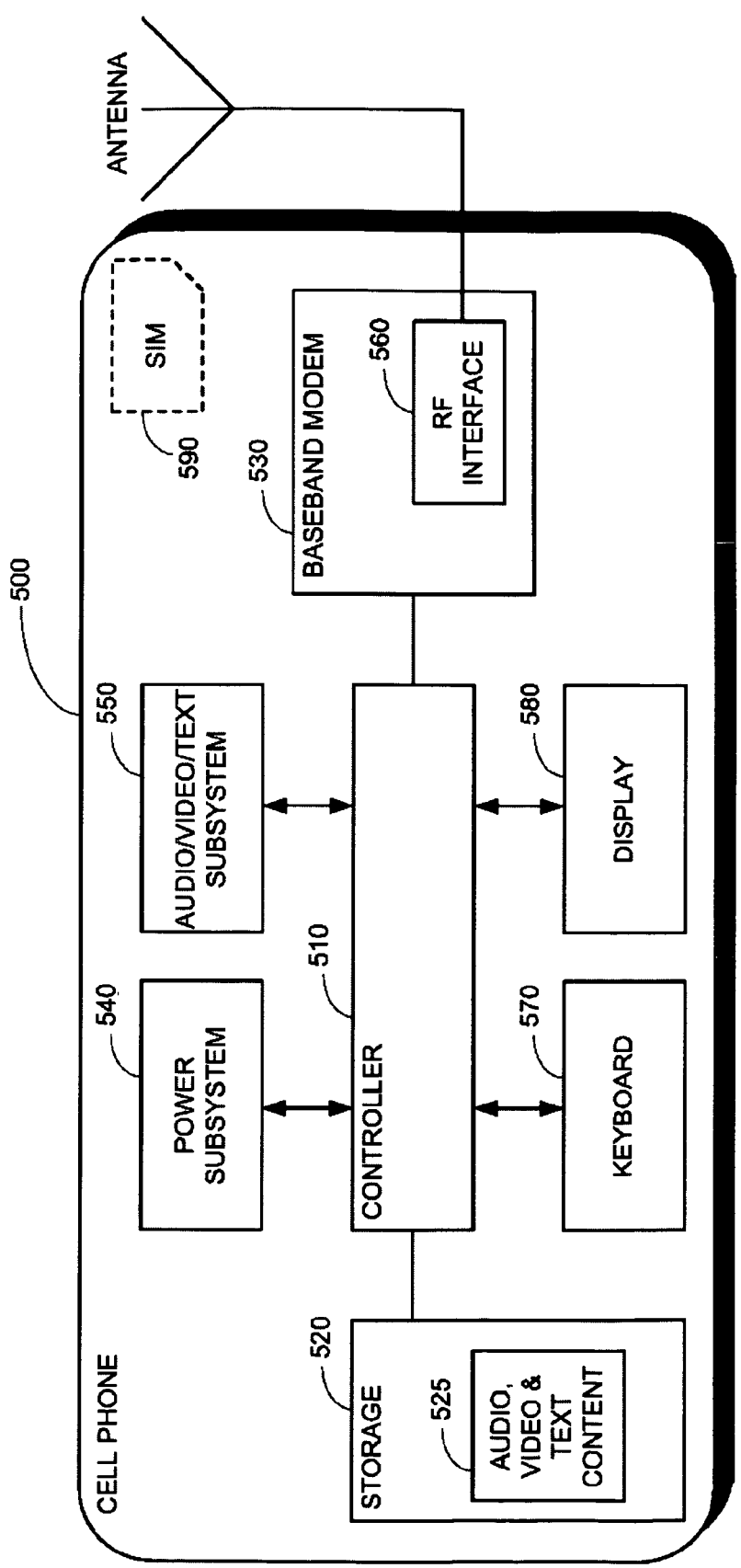
FIG. 5 is a simplified block diagram of a cell phone that operates in a normal mode and in an idle mode, in accordance with an embodiment of the present invention.

Reference is now made to FIG. 5, which is a simplified block diagram of a cell phone 500 that operates in a normal mode and in an idle mode, in accordance with an embodiment of the present invention. As shown in FIG. 5, cell phone 500 includes five primary components, as follows: an ASIC controller 510, a memory storage 520, a baseband modem 530 for sending and receiving voice communications, a power subsystem 540 and an audio/video/text subsystem 550.

ASIC controller 510 executes programmed instructions that operate the normal mode and the idle mode of cell phone 500, in accordance with FIGS. 1-3.

A caller's audio, video and text content 525 is stored within memory storage 520, and is played by one or more content players within audio/video/text subsystem 550 during idle mode, as instructed by controller 510.

Baseband modem 530 includes a radio frequency (RF) interface 560 that is connected to an antenna. Power subsystem 540 includes a power management integrated circuit.

Cell phone 500 also includes a keyboard 570, a display 580 and an optional SIM card 590. SIM card 590 may be used, for example, with GSM networks.

TABLE I summarizes activation and operation of idle mode, in accordance with an embodiment of the present invention. TABLE I refers to a "first user" and a "second user", instead of a caller and a callee, since either or both of the caller's and callee's cell phones may implement idle mode.

TABLE I

Idle Mode Functionality

| | Activation/de-activation of idle mode | Operation of idle mode |
|---|---|---|
| Manual | First user manually switches first user's phone to idle mode. Second user presses button on second user's phone in order to stop idle mode on first user's phone and resume conversation. | First user manually chooses to play designated music, movies, video clips or text on first user's phone. First user manually chooses to play advertisements on first user's phone. First user is able to skip over ads. Information about ads played and ads skipped is used to classify and learn first user's preferences. |
| Automatic | First user's phone is automatically switched to idle mode during call ringing, call waiting and call holding. Idle mode on first user's phone is automatically stopped when conversation with second user occurs. | First user's phone automatically plays designated music, movies, video clips, text or advertisements, according to first user's preference. |

In reading the above description, persons skilled in the art will realize that there are many apparent variations that can be applied to the methods and systems described. In particular, it will be appreciated that the present invention applies to 3G video conversations, in addition to voice conversations.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for effective utilization of call idle time, comprising:
   detecting by a processor of a phone, that a first person using the phone has initiated a phone call to a second person, and that the second person has not yet answered the call, wherein the phone is operative in an idle mode to present content pre-designated by the first person, and is operative in a normal mode to send and receive voice communications to and from the second person and to not present the pre-designated content;
   activating, by the processor of the phone, the idle mode of the phone in response to said detecting;
   subsequently detecting, by the processor of the phone, that the second person has answered the call; and
   subsequently activating, by the processor of the phone, the normal mode of the phone in response to said subsequently detecting.

2. The method of claim 1 wherein the pre-designated content is content stored locally on the phone.

3. The method of claim 1 wherein the pre-designated content is content served by a content server computer, and wherein the phone is operative to retrieve the pre-designated content from the content server computer via wireless communication.

4. The method of claim 3 wherein the content server streams the pre-designated content to the phone.

5. The method of claim 3 wherein the phone downloads the pre-designated content from the content server.

6. The method of claim 1 further comprising storing a position indicating where the pre-designated content stopped being presented when said activating the normal mode occurred, and wherein the phone is operative in idle mode to resume presenting the pre-designated content at the stored position.

7. The method of claim 1 wherein the pre-designated content is music content.

8. The method of claim 1 wherein the pre-designated content is video content.

9. The method of claim 1 wherein the pre-designated content is text content.

10. The method of claim 9 wherein the text content is a digital book.

11. The method of claim 1 wherein the phone is operative in idle mode to play a game.

12. The method of claim 11 wherein the game is a single player game.

13. The method of claim 11 wherein the game is a multi-player game with other phone users.

* * * * *